July 1, 1924.　　　　　　　　　　　　　　　　　　1,499,677
J. M. MASON
PISTON FOR USE IN CYLINDRICAL VALVE CHAMBERS AND CYLINDERS
Filed Jan. 27, 1923

Inventor:
J. M. Mason
By Marker Clerk
Atty's

Patented July 1, 1924.

1,499,677

UNITED STATES PATENT OFFICE.

JOHN MERRILEES MASON, OF NORTH WILLIAMSTOWN, VICTORIA, AUSTRALIA.

PISTON FOR USE IN CYLINDRICAL VALVE CHAMBERS AND CYLINDERS.

Application filed January 27, 1923. Serial No. 615,287.

*To all whom it may concern:*

Be it known that I, JOHN MERRILEES MASON, a British subject, residing at No. 80 Hannan Street, North Williamstown, in the State of Victoria and Commonwealth of Australia, have invented new and useful Improved Pistons for Use in Cylindrical Valve Chambers and Cylinders, of which the following is a specification.

My improved piston for use in cylindrical valve chambers and cylinders has been designed for the purpose of dispensing with piston rings. A piston of the class described, manufactured according to my invention, is preferably steam, gas, and water tight, its use results in practically little wear on the inner wall of the cylinder, and such slight wear that does occur can be easily and quickly taken up.

My improved piston consists essentially in the combination with a circular steel rod, or alternatively with a cast iron block, of a circular steel liner which is spaced apart from said rod or block, the space between the wall of the liner and the rod or block being packed by means of caulking with some compressible material, such as lead or other malleable metal, but preferably the former, so as to expand the wall of the liner in order to make a driving fit in the valve chamber.

Referring to the sheet of drawings hereto annexed, in which the same reference numerals are used to indicate the same parts wherever they occur:—

Figure 1:
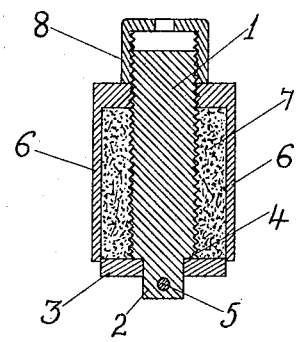
Figure 1 is a sectional side elevation of a piston constructed according to my invention, and adapted for small cylinders varying in diameter from half an inch to one and a half inches.
Figure 2:
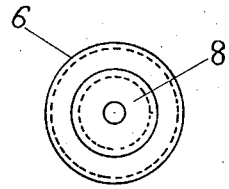
Figure 2 is a plan view of Figure 1.

Referring now more particularly to Figures 1 and 2 which, as before explained, illustrate my invention adapted for use with a small cylinder. 1 is a steel rod which is screwed with a fine thread, one end 2 thereof being reduced in diameter to permit it to pass through a hole in a round collar 3, the flange 4 so formed on the end of the rod 1 abutting against the said collar and being held in position by a split pin 5. 6 is a steel liner, the bottom of which is preferably one quarter of an inch in thickness, while the wall thereof is preferably a bare one thirty-second of an inch in thickness, so as to permit of said wall being expanded. The bottom of said liner is provided with a screwed opening to permit of said liner being screwed on to the steel rod 1. 7 is packing, preferably lead, between the inner wall of the liner 6, and the steel rod 1. 8 is an externally screwed cap which engages with the screwed end of the steel rod to lock it in position. The packing is caulked into the space between the wall of the liner and the rod after removing the collar 3 until the wall of the liner is expanded sufficiently to make the necessary driving fit between said wall and the inner wall of the cylinder. The collar 3 is then replaced.

Figure 4:
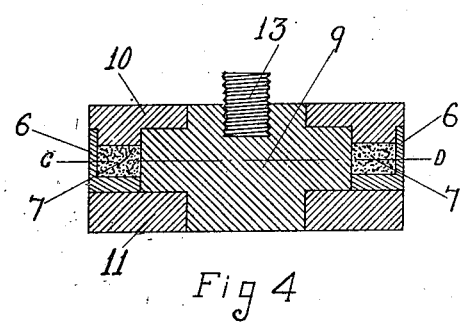
Figure 4 is a sectional side elevation of Figure 3 on the line A—B.
Figure 3:
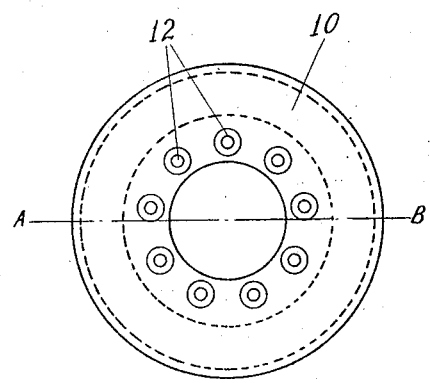
Figure 3 is a plan view of a modified form of my piston adapted for cylinders of large diameter.
Figure 5:
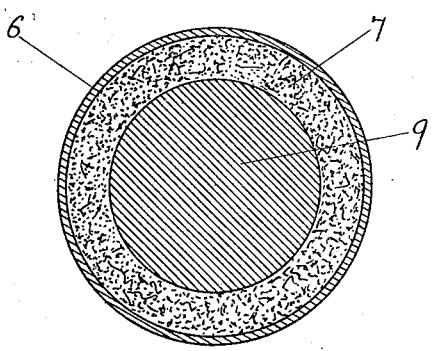
Figure 5 is a sectional plan view of Figure 4 on the line C—D.

Referring now to Figures 3, 4, and 5, which illustrate my invention adapted for use with a large cylinder, 9 is a circular cast iron block recessed at top and bottom to receive junk rings 10 and 11 which are attached to said block by set screws (not shown). 12 are countersunk holes to receive said set screws. The block 9 is tapped and screwed to take an externally screwed piece of steel 13 for connecting the valve spindle thereto. 6 is a circular steel liner the bottom of which is preferably twice the thickness of its wall. 7 is packing, preferably lead, between the liner 6 and the block 9, which packing is caulked into the space between the liner 6 and the block 9 after removing the junk ring 10, until the wall of the liner is expanded sufficiently to make the necessary driving fit between said wall and the inner wall of the cylinder. The junk ring 10 is then replaced.

Should any wear occur in a piston constructed in accordance either with Figures 1 and 2, or Figures 3, 4, and 5, such wear can easily be taken up by adding more packing.

I claim:—

1. A piston for use in cylindrical valve chambers and cylinders, consisting of the combination with a circular body member, of a circular steel liner, which is spaced apart from said body member, the space between the wall of the liner and the body member being packed by means of caulking with some compressible material, such as lead, as and for the purpose described.

2. A piston for use in cylindrical valve chambers and cylinders of small diameter, consisting of a screwed steel rod, one end being reduced in diameter to pass through a round collar, means such as a split pin for keeping the flanged end of said rod in contact with said collar, a steel liner screwed on to the said steel rod, the wall of the liner, which is spaced apart from said rod, being thinner than the bottom, the space between the rod and the liner being packed by means of caulking with some compressible material such as lead, and a screwed cap in engagement with the screwed end of the said rod as and for the purpose described.

JOHN MERRILEES MASON.